Jan. 28, 1969 M. MORSE 3,423,778
MEANS AND METHOD OF MAKING THREADED FASTENERS
Filed Oct. 12, 1966

United States Patent Office 3,423,778
Patented Jan. 28, 1969

3,423,778
MEANS AND METHOD OF MAKING
THREADED FASTENERS
Milton Morse, Fort Lee, N.J.
(41 Honeck St., Englewood, N.J. 07631)
Filed Oct. 12, 1966, Ser. No. 586,295
U.S. Cl. 10—2
Int. Cl. B21h *3/02;* B21d *11/06;* F16b *35/00*
6 Claims This invention relates to threaded fasteners as described in my copending application Ser. No. 586,296, filed Oct. 12, 1966. In my copending application Ser. No. 586,296, filed Oct. 12, 1966, I form a spiral in the shank of a threaded fastener at the same time that I form the threads. In so doing I cause a tilting of the pitch lines, as illustrated in FIG. 1A and it is among the objects of the present invention to provide means and methods for producing threaded fasteners having a spiral axis and having constant thread pitch lines.

This object, and other objects, ends and advantages, will more fully appear in the progress of this disclosure and be pointed out in the appended claims.

In the drawings in which similar reference characters designate corresponding parts throughout the several views.

Figure 1:
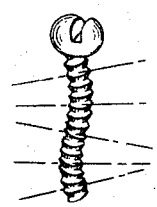
FIGURE 1 is an exaggerated perspective view of a threaded fastener with tilted nonuniform pitch lines.
Figure 2:
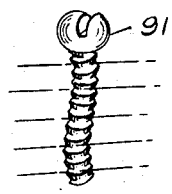
FIGURE 2 is an exaggerated perspective view of a threaded fastener with constant uniform pitch lines.
Figure 2A:
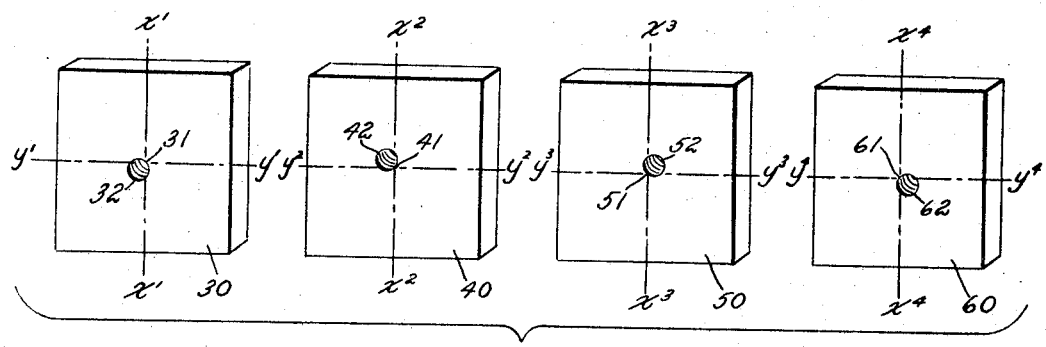

FIGURE 2A displays a group of exaggerated perspective views of a set of sliding plates with disaligned threaded orifices, showing a first stage in the present method.

Figures 3, 4, 5:
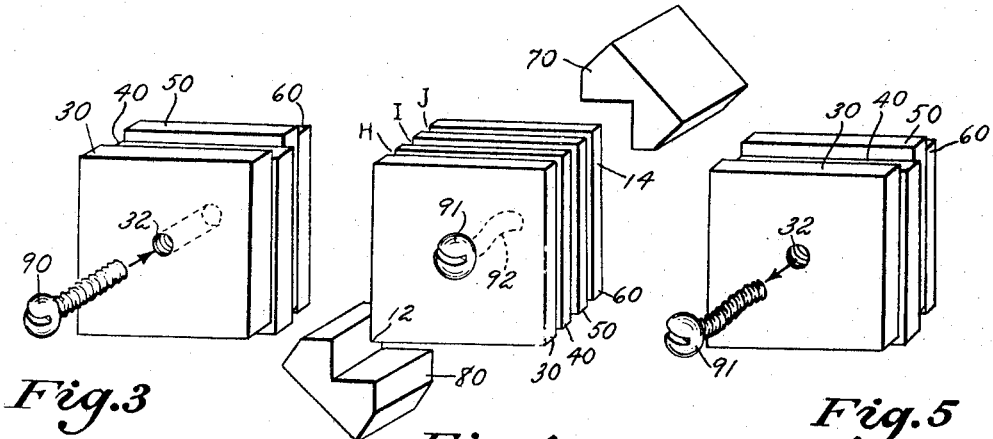

FIGURE 3 is an exaggerated perspective view showing a second stage.

FIGURE 4 is an exaggerated exploded perspective view illustrating a third stage.

FIGURE 5 is an exaggerated exploded perspective view of a fourth stage.

Figure 6:
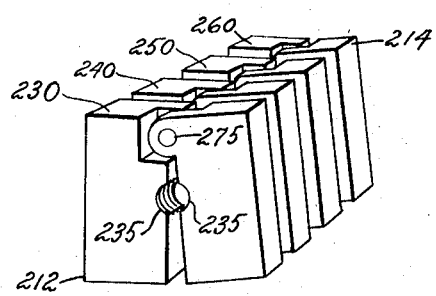

FIGURE 6 is an exaggerated exploded perspective view comparable to FIGURE 5 showing a modification.

In cases where it is necessary to maintain constant pitch lines as in FIGURE 2, I have found it best to use a sliding plate method. The sliding plates 30, 40, 50, and 60 are illustrated in FIG. 2A, a bracketed group. An examination of FIGURE 2A shows the tapped hole 32 is offset from the exact center 31. This offset is left of vertical axis $x^1$—$x^1$ and below axis $y^1$—$y^1$. In plate 40 tapped hole 42 is offset from center 41, left of axis $x^2$—$x^2$ and above axis $y^2$—$y^2$. In plate 50 tapped hole 52 is offset from center 51, right of axis $x^3$—$x^3$ and above axis $y^3$—$y^3$. In plate 60 tapped hole 62 is offset from center 61, right of axis $x^4$—$x^4$ and below axis $y^4$—$y^4$.

When the threaded holes 32, 42, 52 and 62 are aligned as in FIGURE 3, I can screw the fastener blank 90 into the plates, the size and thread of the blank 90 being substantially identical to the tapping in the holes 32, 42, 52, and 62. Note at this point that the edges of plates 30, 40, 50 and 60 are now disaligned.

After blank 90 has been inserted into the stacked plates which are slightly spaced from each other as indicated at H, I, and J to permit free movement of the plates without binding, I force the outside edges of plates 30, 40, 50, and 60 into alignment in a suitable manner as by clamping them at their corners 12 and 14 edgewise between V-blocks 70 and 80. The result is that the inserted blank is changed in shape and caused to assume a spiral, illustrated by dotted lines 92 in FIGURE 4. In FIGURE 5, the V-blocks have been removed from their clamping position and the finished fastener 91 is unscrewed from the plates 30, 40, 50, and 60 which being again free to move allow the now spiraled fastener 91 to be removed.

Turning to the modification shown in FIGURE 6, to avoid repetition certain of the parts are given the same reference character with the addition of the prefix 2. This modification differs from the earlier described form in splitting each of the plates 230, 240, 250, and 260 into two halves which are hingedly interconnected, only the outermost hinge pin being visible in said figure at 275, so that the screw may be removed from said plates after the spiraling operation without the need of unscrewing the entire fastener. This modification also differs in that plate 230 is also a threading die having the thread cutters 235 so that an unthreaded fastener blank (not shown) becomes threaded as it is inserted axially into the stacked plates 230, 240, 250, and 260 while the holes therein are in alignment and before the clamping which aligns their outer corners 212 and 214.

The sliding plates and clamping means may be made in other shapes in order to facilitate the above described operations without departing from the true spirit of my invention. Similarly, fewer or more than four plates may be used to perform the same function if required.

I claim:

1. Structure for forming a spiraled threaded fastener comprising a plurality of plates each having a hole, at least a portion of which is threaded, and means to disalign the portion having the hole of said plates.

2. Structure as claimed in claim 1 in which all of each hole is threaded.

3. Structure as claimed in claim 1 in which the plates have a uniform transverse dimension along a predetermined axis, the exterior edges of said plates being in alignment when the holes are disaligned in a predetermined pattern.

4. Structure as claimed in claim 1 in which each plate is composed of at least two parts which are movable with respect to each other.

5. Structure as claimed in claim 4 which said parts are hinged to each other.

6. Structure as claimed in claim 1 in which the outermost plate is a threading die.

References Cited

UNITED STATES PATENTS 499,092   6/1893   Bowman _____ 10—116

CHARLES W. LANHAM, *Primary Examiner.*

LOWELL A. LAWSON, *Assistant Examiner.*

U.S. Cl. X.R.

72—308, 311; 85—41